May 29, 1962
H. GRIMMINGER ETAL  3,036,930
PROCESS FOR IMPROVING THE ADHESIVENESS OF POLYOLEFINS
Filed Dec. 22, 1958
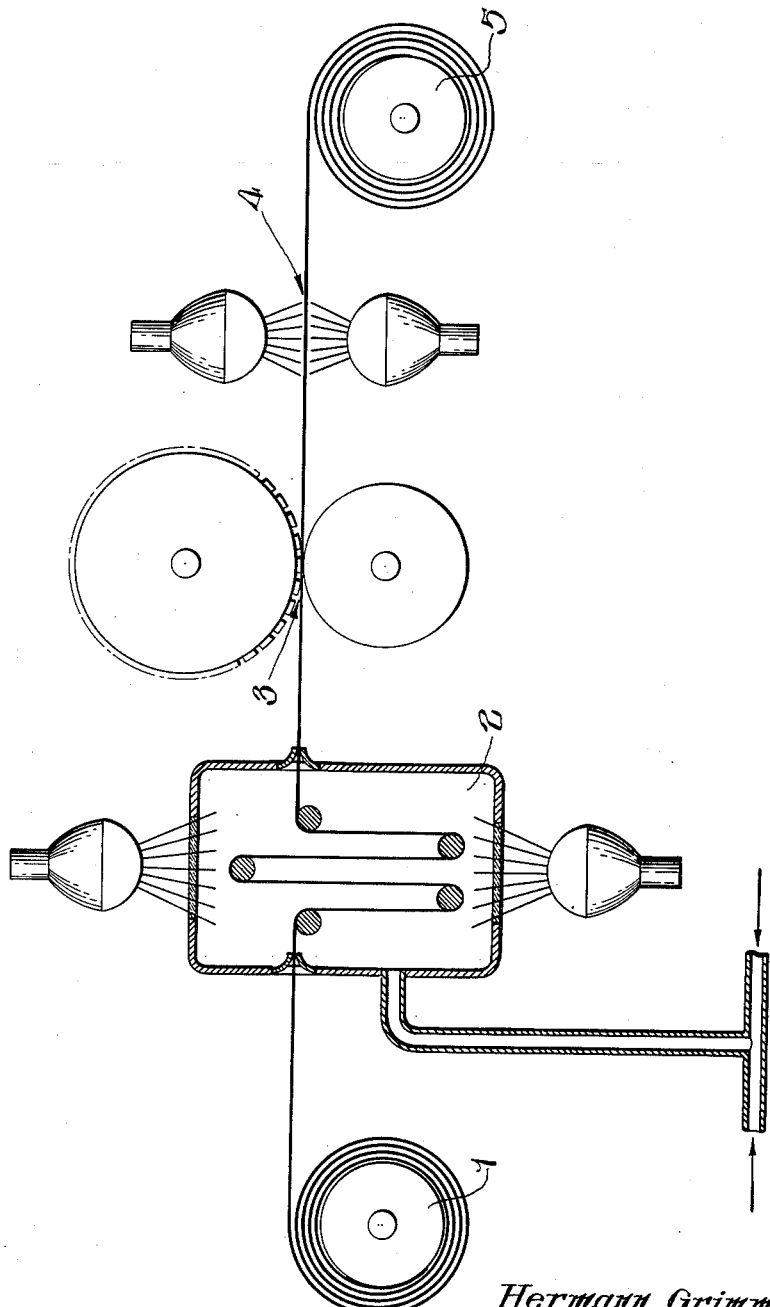
INVENTORS
Hermann Grimminger
Bernd Hamprecht
BY Connolly and Hutz
ATTORNEYS

United States Patent Office 3,036,930
Patented May 29, 1962

3,036,930
PROCESS FOR IMPROVING THE ADHESIVENESS OF POLYOLEFINS
Hermann Grimminger and Bernd Hamprecht, both of Frankfurt am Main, Germany, assignors to Farbwerke Hoechst Aktiengesellschaft vormals Meister Lucius & Brüning, Frankfurt am Main, Germany, a corporation of Germany
Filed Dec. 22, 1958, Ser. No. 782,330
Claims priority, application Germany Dec. 24, 1957
8 Claims. (Cl. 117—93)

The present invention relates to a process for improving the adhesiveness of polyolefins.

It is known that it is difficult to provide olefin polymers, for example polyethylene, polypropylene and copolymers of ethylene and propylene with a well adhering printing, bond or coating of different kind, owing to the special molecular structure of these high polymers. As it is known, these polyolefins have linear or branched hydrocarbon chains, that is to say nonpolar molecules, and therefore develop only very insufficient adhesive powers at their surfaces which, besides, are smooth, waxy and substantially free from pores.

Attempts have been made to overcome these difficulties by heating the surface of the polyethylene, if necessary with simultaneous cooling of the lower layers of the material. It has also been proposed to activate the surface of the material by bombardment with electrons or by a corona discharge. These processes, however, are difficult to realize and unsatisfactory. According to another proposal, the polyolefins are superficially chlorinated, while being simultaneously irradiated with ultraviolet light (cf., for example, U.S. patent specification No. 2,502,841). By this method the surface adhesion is improved to a certain extent which is, however, not sufficient for the practical application of the products.

We have found that good adhesive coatings, coats of paint and printings can be obtained on the surfaces of polymers of olefins, for example polyethylene, polypropylene, and copolymers of ethylene and propylene as well as polymers and copolymers of higher olefins, while using the macromolecular film-forming substances specified hereinafter, if these surfaces are treated, prior to coating, in a reaction chamber with a mixture of gaseous chlorine and gaseous sulfur dioxide with simultaneous irradiation. The ratio of chlorine:sulfur dioxide may vary within wide limits, the results obtained by the process of the invention depending to a high degree on the proportion by volume of the two gases. The ratio of chlorine:sulfur dioxide of the gas mixture may range between 10:1 and 1:20. Critical surface tension data, which were obtained by studying the surface tension that a given liquid may have and still spread on the surface as a function of ratio of $Cl_2:SO_2$ indicated that an optimum ratio of $Cl_2:SO_2$ is about 1:10. Another one is in the range between 3:1 and 1:4 depending on the reaction conditions.

As light sources quartz lamps (mercury lamps) or incandescent lamps of high power may be used with equal success. For a polyolefin sample having a surface area of about 30 x 40 cm., a lamp power of at least 1000 watts appears suitable in the interest of a short reaction time. With a distance, for example, of about 5 to 25 cm. between such a light source and the surface to be treated and with the intercalation of a glass plate about 4 mm. thick, a pretreatment by irradiation of about ½ to 30 minutes is, in general, sufficient for a subsequent bonding, so that the process may also be carried out continuously, if desired. With shorter distances down to 0.6 cm. the irradiation time required can be reduced to less than 2 minutes.

The upper limit of the temperature prevailing in the reaction chamber is given by the stability of the polyolefin or the shaped article made thereof. In the case of the normally applied radiation intensities a special cooling device may be dispensed with. It may, however, be used, if desired. In general, no special measures for controlling the temperature are necessary and the process can be carried out at the temperature produced by the irradiation and the reaction heat which is, for example, between room temperature and about 40 to 50° C. under the conditions indicated above.

The process of the invention produces substantially no perceptible changes in the surface of the polyolefins. The weldability of the polyolefins is not impaired. Their susceptibility of being wetted with water is excellent. Before being further treated, the polyethylene products leaving the reaction chamber must be sufficiently aired, advantageously at an elevated temperature, in order to remove any gases originating from the reaction which may still adhere to the surface of the products.

The process of the invention is applicable to all polyolefins regardless of the kind of their manufacture (cf. also Raff and Allison "Polyethylene," 1956, page 72 et seq.). Besides high pressure polyolefins, low pressure polyolefins may be used, for example the so-called Ziegler polyolefins (cf. Belgian patent specifications Nos. 533,362; 534,792; 534,888 and 540,459). These polyolefins are distinguished by special properties. For example, the polyethylene prepared by the polymerization process according to Ziegler using a catalyst system consisting of an organo-metal compound and a compound of an element of sub-groups IV to VI of the periodic table, has a molecular weight of above 50,000, a melting point of above 125 to 131° C., a density of at least 0.94 ("high density polyethylene"), a degree of crystallinity of about 80% and a substantially straight-chained, unbranched structure. Besides polyethylene, there may, for example, also be coated according to the invention polypropylene, polybutylene and polymers of olefinic compounds having a carbon chain of 5 and more carbon atoms as well as copolymers of various olefins and mixtures of various polyolefins.

As macromolecular film-forming substances to be used for coating the above mentioned polyolefins, the said polyolefins may be employed. There may, however, also be used other macromolecular substances, for example chlorinated polyethylene, sulfochlorinated polyethylene, polyisobutylene, polyvinyl acetate, polyvinyl alcohol, polyvinyl chloride, polyvinyl chloracetate, polyvinyl propionate, polyesters, polyamides, natural rubber, copolymers of butadiene and acrylonitrile, copolymers of butadiene and styrene, neoprene, polyacrylic acid, polyacrylic acid esters, polyacrylonitrile, silicones, polystyrene, alkyd resins, epoxy resins, copolymers of polyvinyl chloride with other vinyl monomers such as vinyl esters and vinyl ethers, or acryl monomers. There may furthermore be used mixtures of the above mentioned artificial materials with resins such as alkyd and cyclohexanone resins, if desired with the addition of an appropriate plasticizer such as chlorodiphenyl, phthalic acid esters, phosphoric acid esters; and melamine resins.

After drying, all these film-forming substances adhere firmly to the surfaces so treated and cannot be removed, for example, by adhesive tapes which are pressed thereon and pulled off again. Nor can they be removed by scratching with the fingernail or, if they have been applied, for example, to foils, by creasing and/or rubbing.

The process of the invention can be applied without difficulty, for example, for printing or bonding even very thin foils. Owing to the high shear strength of the bond obtained, the process of the invention is especially suitable for bonding foils of low pressure polyethylene to which a high strength has been imparted by a stretching in both directions at a temperature below the crystallite melting point and which cannot be combined by the usual welding and heat-sealing processes.

Various processes are known for sulfochlorinating polyolefins, the polyolefin being subjected to the sulfochlorination in the molten, dissolved or solid state. The products obtained by these processes are entirely different from the artificial materials used as starting materials and possess substantially different mechanical, physical and chemical properties. These known processes which are associated with a considerable change in the starting material did not at all suggest the process of the invention according to which an excellent surface adhesion can be obtained by a short sulfochlorination which acts only upon the boundary areas of the surface while the artificial material remains substantially unchanged and which consequently does not impair the fastness of the material to solvents or its mechanical and electrical properties.

The following method of operation for the continuous printing of foils of polyethylene is described hereafter, without, however, limiting the application thereto; it is illustrated, by way of example, in the accompanying drawing:

The foil which has been wound up on the roll 1 is delivered from said roll to the reaction chamber 2 through which it travels in several bends. With a predetermined speed of the foil, the number of the bends depends on the necessary reaction time and the dimensions of the reaction chamber. In the reaction chamber the surface of the foil is sulfochlorinated. After the reaction chamber, the foil is suitably aired (not shown in the drawing) in order to eliminate any gases which may still adhere to the foil. The foil is then printed at 3. Drying of the printing is accelerated by the infrared radiators 4. The printed foil is then wound up on the roll 5.

The following examples serve to illustrate the invention but they are not intended to limit it thereto:

*Example 1*

Foils of low pressure polyethylene which had been prepared by stretching in both directions at a temperature below the crystallite melting point and which were about $50\mu$ thick and had a strength of about 1800 kg./cm.$^2$ in both directions of stretch, were treated according to the invention for 2 to 5 minutes. As light source an incandescent lamp of 1000 watts was used. The proportion by volume of $SO_2:Cl_2$ was about 1:1. The temperature prevailing in the reaction chamber was about 40 to 50° C. The foils thus pretreated were bonded in known manner with an adhesive based on a commercial adhesive ®Planatol PB 32 of Planatol-Werk, W. Hesselmann, Rosenheim-Thansau, Upper Bavaria, Germany, in a manner such that the foils overlapped one another. The strips of foil used had a width of about 20 millimeters and the overlap was 4 to 5 millimeters wide. The bonded strips were then subjected to tension testing. In most cases the samples did not break in the bond itself but in the foil material, that is to say the strength of the bond produced by the adhesive film was better than the strength of the foil. The period of time for which the foil was stored after the treatment according to the invention had no influence upon the quality of the bond.

*Example 2*

Foils of low pressure polyethylene which were about $50\mu$ thick were treated according to the invention for about 15 to 30 minutes. As light source an incandescent lamp of 1000 watts was used. The proportion by volume of $SO_2:Cl_2$ was about 1:1. The temperature prevailing in the reaction chamber was about 40 to 50° C. The foils so pretreated were printed in known manner, either immediately after the sulfochlorination or after a time of storage of desired length, with a pigment lacquer of the following composition: 80% of benzene, 14.3% of cyclohexanone, 1.82% of methoxybutyl acetate, 1.71% of polyvinyl chloride, 1.09% of PV Fast Yellow HR, 0.54% of dibutyl phthalate and 0.54% of dioctyl phthalate, the percentages being by weight. The foils were then dried by infrared radiators. The adhesion of the lacquer was so good that in many cases the foils broke in the adhesive tape test but the color could not be removed from the foils. Nor could the print be removed by scratching with the fingernail or by rubbing and/or creasing the printed foil.

*Example 3*

Biaxially stretched foils of low pressure polyethylene which were about 30 to $40\mu$ thick were sulfochlorinated for about 10 to 15 minutes according to the process of the present invention. As light source an incandescent lamp of 1000 watts was used which was about 13 cm. from the surface of the foils. The proportion by volume of $Cl_2:SO_2$ in the gas mixture in the reaction chamber was about 2:1. The temperature in the reaction chamber was about 40 to 50° C. The foils thus pretreated were printed in known manner with a pigment lacquer based on polyvinyl chloride. The printing was carried out in one case immediately after the sulfochlorination and in another case after a desired time of storage, the same good result being obtained. After cooling of the printing, the adhesion of the lacquer was so good that the foils broke in the adhesive tape test but the color could not be removed from the foils. Nor could the lacquer be removed by scratching or creasing and rubbing.

*Example 4*

Foils of low pressure polypropylene about $70\mu$ thick were treated for about 15 to 30 minutes according to the process of the present invention. As light source an incandescent lamp of 1000 watts was used which was 13 cm. from the surface of the foil. The proportion by volume of $SO_2:Cl_2$ was about 1:2. The temperature in the reaction chamber was about 40 to 50° C. The foil thus pretreated was printed at any desired time after the sulfochlorination with a pigment lacquer, the same good result being obtained in each case. The pigment lacquer had the following composition: 60.8% of cyclohexanone, 30.0% of benzene, 3.0% of amorphous polypropylene containing about 10 to 15% of a crystalline portion, 4.9% of polyvinyl chloride and 1.3% of pigment. After evaporation of the solvent, the adhesiveness of the lacquer was excellent. The lacquer could not be removed from the foil in the adhesive tape test nor by scratching with the fingernail. Nor could it be removed by creasing and rubbing.

*Example 5*

Unstretched foils of low pressure polypropylene were sulfochlorinated for 15 to 20 minutes in accordance with the process of the present invention. As light source an incandescent lamp of 1000 watts was used. The proportion by volume of $Cl_2:SO_2$ was about 3:1. The distance between the lamp and the foil surface was about 13 cm. The foils were then printed in known manner with the lacquers indicated in the preceding examples, the printing being carried out immediately after the sulfochlorination or at any desired time thereafter. The quality of the adhesion of the lacquer manifested itself in a very good resistance to scratching, rubbing and creasing. The results ascertained in the adhesive tape test were excellent.

*Example 6*

Foils of a copolymer of ethylene and propylene prepared by a low pressure process were treated according to the invention for 15 to 20 minutes with a mixture of gaseous $Cl_2$ and gaseous $SO_2$. As light source an incandescent lamp of 1000 watts was used which was about 21 cm. from the foil surface. The proportion by volume of $Cl_2:SO_2$ was 2:1. The temperature in the reaction chamber was about 40° C. The foils thus pretreated were treated with the lacquers mentioned above, an excellent adhesion of the lacquer being obtained. The printing was resistant to excessive stress due to scratching, rubbing and creasing. In many cases the foils broke in the adhesive tape test but in no case could the lacquer be removed from the foils.

*Example 7*

Foils of low pressure polypropylene about 70μ thick which had been prepared by stretching in both directions at a temperature below the crystallite melting point and which had a maximum strength of about 2000 kg./cm.$^2$ were treated for about 20 to 30 minutes according to the process of the present invention. As light source an incandescent lamp of 1000 watts was used. The distance between the light source and the foil surface was about 15 cm. The proportion by volume of $Cl_2$:$SO_2$ was 2:1. Strips, about 20 millimeters wide, of the pretreated foils were then joined with an overlapping joint of about 5 millimeters using the adhesive described in Example 1. The bonded strips were then subjected to tension testing carried out at a load rate of up to 300 millimeters/minute. In about 50% of the tests the specimens failed in the foil material and not in the adhesive bond, that is to say the strength of the bond produced by the adhesive film exceeded the strength of the bonded material. As compared with the foil material which had not been pretreated, the shear strength of the bond was increased by more than 100%.

*Example 8*

Molded, unoriented sheets of clear, unpigmented polypropylene, ca. 1.9 mm. in thickness, were exposed to a mixture of 10:1 $SO_2$:$Cl_2$, by volume. Time of exposure was one minute under the influence of ultraviolet light whose wavelength at peak emission was 3654 A. The source was 0.6 to 1.3 cm. from the sheet. Strips, 2.5 cm. wide, of the pretreated polypropylene sheet were then joined with an overlapping joint of 1.3 cm. A commercially available adhesive composed of a 30:70 blend, by weight, of a conventional epoxy-based adhesive and a polyamide flexibilizer was used for joining the sheets. Curing of the adhesive was effected by heating, under pressure, for 1 hour at about 94° C.

Adhesive bond strengths were determined in shear at a rate of 600 to 700 p.s.i./minute (ASTM D1002–53T). In all cases, failure was not in the adhesive bond. The plastic yielded outside the bonded area and failure was in the plastic. Failing load was in excess of 590 p.p.s.i. of bonded area. Untreated polypropylene, when bonded under the same conditions, gave a bond strength of 100 p.s.i. and the failure was in the adhesive bond.

Sulfochlorination of polypropylene sheet, under the conditions described above, does not change the bulk physical properties. The advantageous effects of the treatment persisted over extended periods of time and could not be washed or rubbed off by water or any solvent.

*Example 9*

Molded, unoriented sheets of polypropylene, containing 2½ to 3% by weight of carbon black, were prepared in thicknesses of approximately 1.9 mm. These were exposed to a mixture of 10 parts $SO_2$ to 1 part $Cl_2$, by volume, for one minute. The treating zone was irradiated by an ultraviolet source whose wavelength at peak emission was 3654 A. The ultraviolet source was 0.6 to 1.3 cm. from the black sheet. Lap shear bonds were prepared and tested in a manner identical to that described in Example 8.

The adhesive specimens failed in the plastic at a load in excess of 600 p.p.s.i. of bonded area. At no time was failure noted in the adhesive bond.

Note was made that in the sulfochlorination of the carbon black-pigmented sheet, the side to be bonded did not have to be directly exposed to the ultraviolet source. However, the equipment used permitted reflection of the ultraviolet rays to the unexposed side of the film.

*Example 10*

Unpigmented poly(4-methyl pentene-1) was compression molded into clear sheets 0.25 mm. in thickness. These films were exposed to a 10:1 ratio of $SO_2$ to $Cl_2$, by volume, for one minute. Simultaneously, they were irradiated with an ultraviolet source whose wavelength at peak emission was 3654 A.

Strips 6.4 mm. wide were cut from the 0.25 mm. thick sheet and adhesive bonds prepared with a 3.2 mm. overlap. Bonds were made by means of the adhesive described in Example 8 and the testing procedure outlined in Example 8 was used. Untreated films of poly(4-methyl pentene-1), when bonded, fell apart upon removal from the mold and could not be tested. Treated films, however, provided strengths in excess of 150 p.p.s.i. of bonded area and failure was always in the plastic, not in the bond itself.

We claim:

1. A process for improving the adhesiveness of the surface of a shaped body of an olefin polymer to a macromolecular film-forming material which comprises treating said shaped body in dry state with a mixture of gaseous chlorine and sulfur dioxide while simultaneously exposing it to light.

2. The process of claim 1 wherein the chlorine:sulfur dioxide ratio of the gas mixture is between 10:1 and 1:20.

3. The process of claim 1 wherein a low pressure polyolefin is treated.

4. The process of claim 3 wherein low pressure polyethylene is treated.

5. A process for improving the adhesiveness of the surface of a shaped body of an olefin polymer to a macromolecular film-forming material which comprises treating said shaped body in dry state with a mixture of gaseous chlorine and sulfur dioxide while simultaneously exposing it to an ultraviolet radiation.

6. A process for treating the surface of a shaped article composed of an olefin polymer so as to render it readily bondable to coating agents, said process comprising contacting the surface of said shaped article in the dry state prior to coating with a mixture of gaseous $Cl_2$ and $SO_2$ with simultaneous irridation, whereby the article is superficially chlorosulfurated but its interior is unchanged.

7. A shaped body of an olefin polymer, the surface of which is chlorosulfurated by treatment with a dry mixture of chlorine and sulphur dioxide while the bulk material is unchanged, said surface having an improved adherence to macromolecular film-forming substances.

8. A shaped body of a polyethylene, the surface of which is chlorosulfurated by treatment with a dry mixture of chlorine and sulphur dioxide while the bulk material is unchanged, said surface having an improved adherence to macromolecular film-forming substances.

References Cited in the file of this patent

UNITED STATES PATENTS

| | | |
|---|---|---|
| 2,212,786 | McQueen | Aug. 27, 1940 |
| 2,352,097 | Harold et al. | June 20, 1944 |
| 2,502,841 | Henderson | Apr. 4, 1950 |
| 2,646,422 | Strain | July 21, 1953 |
| 2,709,155 | Cier | May 24, 1955 |
| 2,715,077 | Wolinski | Aug. 9, 1955 |
| 2,852,497 | Thompson | Sept. 16, 1958 |
| 2,879,177 | Nelson et al. | Mar. 24, 1959 |
| 2,889,259 | Noeske | June 2, 1959 |
| 2,925,354 | Berardinelli | Feb. 16, 1960 |

FOREIGN PATENTS

| | | |
|---|---|---|
| 1,046,634 | Germany | Dec. 18, 1958 |